3,594,150
PREPARATION OF SOLID MIXED FERTILIZERS
AND AMMONIUM NITRATE
Raybon C. Cannon, Decatur, Ga., assignor to United
States Steel Corporation, Pittsburgh, Pa.
No Drawing. Filed June 27, 1968, Ser. No. 740,449
Int. Cl. C05b 11/06, 11/12
U.S. Cl. 71—39       9 Claims

ABSTRACT OF THE DISCLOSURE

In a process wherein phosphate rock is digested with nitric acid and ammonium sulfate, and precipitated gypsum removed, water-soluble low $N:P_2O_5$ ratio mixed fertilizers and ammonium nitrate are produced by crystallizing and separating ammonium nitrate from the concentrated mother liquor containing the ammonium nitrate and phosphoric acid and then ammoniating the liquor containing the phosphoric acid and uncrystallized ammonium nitrate. The gypsum after removal from the digestion slurry may be converted to ammonium sulfate by an ammoniation - carbonation reaction for recycle to the digestion step.

BACKGROUND AND SUMMARY

Phosphate rock has been digested with a mixture of nitric acid and recycled ammonium sulfate, the calcium being removed from the system as gypsum which on separation from the reaction slurry leaves a mother liquor containing ammonium nitrate and phosphoric acid. The precipitated calcium sulfate is converted to ammonium sulfate by an ammoniation-carbonation step, the ammonium sulfate being recycled to the digestion step. Concentration, ammoniation, and drying of the mother liquor produce an N–P granular fertilizer. This process is generally referred to as the NAD or Recycle Ammonium Sulfate Nitric Acid Digestion process.

The above NAD process, while very useful, has the disadvantage in that the $N:P_2O_5$ weight ratios are about 2.0 and it is desirable, for product diversification, to produce mixed fertilizers having $N:P_2O_5$ ratios less than 2.0, preferably as low as 1.0 or lower. Several methods have been proposed in prior art to accomplish this desired reduction.

In an ammonium sulfate recycle system, sulfuric acid can be used to partially replace nitric acid and ammonium sulfate or, as in all systems, phosphoric acid can be added. These changes result in a lower ammonium nitrate content in the end products. The necessary quantities of these acids defeat the purpose and the economics of the nitrophosphate concept.

In the Odda process and its variations, calcium nitrate can be crystallized and removed from the
$$Ca(NO_3)_2\text{—}H_3PO_4$$
digestion liquor to a level where the $N:P_2O_5$ ratio in the ammoniated fertilizer product is lowered to 1.0. This procedure suffers from low crystallization temperatures ($-5°$ to $+10°$ C.), reduced water solubility of the products, and lowering of grade analysis by the remaining calcium diluent.

It is also known that ammonium phosphates can be crystallized from the digestion mother liquor of the $HNO_3\text{—}(NH_4)_2SO_4$ recycle process if the pH is raised with ammonia above 2 and preferably 9.0 or higher. This alternative is also objectionable since a clean separation of ammonium phosphate and ammonium nitrate is necessary but not easily achieved. This situation is only approached if the pH is raised to 9 or higher. The use of ammonia to attain such a high pH results in increased quantities of ammonium nitrate coproduct being produced.

I have discovered that ammonium nitrate can be crystallized from concentrated $HNO_3\text{—}(NH_4)_2SO_4$ digestion liquors if the pH of the system is maintained below 1.5, and preferably below 0.5. The ammonium sulfate employed in the digestion step may be recycle ammonium sulfate or ammonium sulfate from any source. By my procedure, sufficient ammonium nitrate can be crystallized from the system to allow production of fertilizer grades with $N:P_2O_5$ ratios of 1.0 or lower. The advantages of this process are that crystallization temperatures below 30° C. are not required to achieve 1.0 ratios, the fertilizer products are essentially water soluble, high analysis is achieved without calcium diluent, a complete separation of phosphate and nitrate is not required, and, finally increased quantities of ammonium nitrate are not produced (as in ammonium phosphate crystallization).

DETAILED DESCRIPTION

The existing NAD process, described above, can be represented by the following equation:

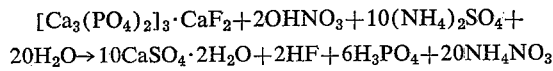

The present invention differs from the above particularly in the following steps. After removal of the gypsum, the $H_3PO_4\text{—}NH_4NO_3$ mother liquor is concentrated by heating and then cooled to crystallize $NH_4NO_3$ from the system. The ammonium nitrate crystals can be separated from the liquor by any suitable means, such as centrifugation or filtration. The liquor is then ammoniated, granulated or prilled, and dried if necessary. Additional plant nutrients can be added. The ammonium nitrate is a coproduct and may be treated in various ways to prepare fertilizer grade solutions or compositions.

Before describing the invention in detail, the following calculations based on the above equation may be set out to illustrate the process for preparing a 1–1–0 fertilizer grade.

[Fertilizer composition without AN crystallization]

|  | N | $P_2O_5$ | Total weight |
|---|---|---|---|
| 20 $NH_4NO_3$ | 560 |  | 1,600 |
| 6 $NH_4H_2PO_4$ | 84 | 426 | 690 |
| Total | 644 | 426 | 2,290 |

Theoretical fertilizer analysis: 28.1–18.6–0

[Fertilizer composition with 25% AN crystallization]

|  | N | $P_2O_5$ | Total weight |
|---|---|---|---|
| 15 $NH_4NO_3$ | 420 |  | 1,200 |
| 6 $NH_4H_2PO_4$ | 84 | 426 | 690 |
| Total | 504 | 426 | 1,890 |

Theoretical fertilizer analysis: 26.7–22.5–0

[Fertilizer composition with 38.9% AN crystallization]

|  | N | $P_2O_5$ | Total weight |
|---|---|---|---|
| 12.21 $NH_4NO_3$ | 342 |  | 977 |
| 6 $NH_4H_2PO_4$ | 84 | 426 | 690 |
| Total | 426 | 426 | 1,667 |

Theoretical fertilizer analysis: 25.6–25.6–0

These theoretical calculations show a 1–1 N–P fertilizer could be produced by crystallizing 38.9% of the ammonium nitrate. Coproduct ammonium nitrate would be 0.375 tons per ton of 25.6–25.6–0 fertilizer product.

One embodiment of the invention may be described as follows:

After the digestion step in which the rock is treated with nitric acid and ammonium sulfate solution, gypsum is separated from the digestion slurry and converted to ammonium sulfate by the addition of ammonia and carbon dioxide, the resulting calcium carbonate being discarded and the ammonium sulfate recycled to the digestion step. The mother liquor is then concentrated and cooled to bring about crystallization of ammonium nitrate. The degree of concentration is not critical. It is sufficient to concentrate to the extent that upon cooling a substantial yield of ammonium nitrate crystals is obtained. A concentration to a level between 70–85 percent solids is satisfactory, and best results have been obtained at levels between 73 and 80 percent solids. The concentrated mother liquor is cooled to between 15 and 45° C. and preferably between 25 and 35° C., although it may be cooled further. The crystallized ammonium nitrate may then be separated from the liquor by centrifugation or other suitable means.

The remaining mother liquor after removal of ammonium nitrate is then ammoniated to produce a fertilizer composition with an N:$P_2O_5$ ratio of about 1.0 or lower. As stated above, the ammonium nitrate is a coproduct and can be used in the crystalline form, melted and prilled by conventional methods, or dissolved to prepare fertilizer grade solutions.

The foregoing process provides a practical method to obtain N–P fertilizer products from nitro-phosphate systems with N:$P_2O_5$ ratios substantially below 2.0 and as low as 1.0 or lower. The product is completely water-soluble and of high analysis, with no calcium diluent. At the same time, a coproduct of ammonium nitrate is provided which is suitable for prilling or for use in nitrogen solution fertilizers.

The following example illustrates the invention and its practical application. The temperatures and concentrations used in the example are not limiting in the operation of the process; that is, the crystallization temperature and concentration can be altered outside of the values shown, depending upon the final N:$P_2O_5$ ratio desired.

Example I

Mother liquor, coded 246–37–1f, obtained from the pilot plant operation of the Armour NAD process was used and had the following analysis:

| Analysis: | Percent |
|---|---|
| Total $P_2O_5$ | 8.55 |
| Total N | 13.22 |
| Ammoniacal N | 6.51 |
| Ca | 0.21 |
| $SO_4$ | 2.12 |
| Fe | 0.22 |
| Al | 0.16 |
| F | 0.38 |

Samples of the above liquor were concentrated to various levels between 73 and 80 percent solids, cooled to temperatures between 35° and 26° C., and the crystallized ammonium nitrate separated from the liquor by centrifugation. The ammonium nitrate crystals were not washed to remove adhering liquor. A summary of the data is given in Table I.

The percent solids of the solution when concentrated is expressed as the sum of the $NH_4NO_3$ and $H_3PO_4$ present. The total nitrogen analysis was used to calculate $NH_4NO_3$ contribution to the percent solids and the $P_2O_5$ analysis to calculate the $H_3PO_4$ content. The remainder of the concentrated liquor is made up of water and the various impurities such as calcium, iron, etc., present as a result of their solubilization from phosphate rock, and unprecipitated sulfate from ammonium sulfate.

TABLE I.—CRYSTALLIZATION $NH_4NO_3$ FROM $NH_4NO_3$–$H_3PO_4$ LIQUOR

| | Solids, percent | Crystallization temperature, °C. | Analysis, percent | | | | | | Calculated N:$P_2O_5$* product ratio | $N_T$ in digestion mother liquor crystallized, percent |
| | | | Filtrate | | | AN crystals | | | | |
| | | | $N_T$ | $NH_3$–N | $P_2O_5$ | $N_T$ | $NH_3$–N | $P_2O_5$ | | |
|---|---|---|---|---|---|---|---|---|---|---|
| Code: | | | | | | | | | | |
| 246–37–1f** | | | 13.22 | 6.51 | 8.55 | | | | 1.80 | 0.0 |
| 250–30–1 | 73 | 35 | 18.08 | 9.23 | 14.94 | 31.53 | 16.36 | 3.29 | 1.46 | 21.6 |
| 250–30–2 | 75 | 35 | 17.82 | 9.60 | 15.50 | 31.21 | 15.91 | 2.57 | 1.40 | 25.5 |
| 250–30–5 | 79 | 35 | 17.40 | 9.17 | 18.47 | 31.51 | 16.33 | 3.29 | 1.14 | 42.4 |
| 250–30–6 | 80 | 35 | 16.42 | 8.95 | 20.65 | 31.54 | 16.43 | 3.20 | 1.05 | 48.3 |
| 250–32–1 | 73 | 30 | 16.91 | 8.11 | 16.16 | 31.74 | 16.77 | 1.74 | 1.30 | 32.6 |
| 250–32–2 | 75 | 30 | 16.64 | 8.01 | 17.26 | 32.38 | 16.48 | 1.37 | 1.21 | 39.0 |
| 250–32–3 | 76 | 30 | 16.33 | 7.76 | 18.25 | 32.41 | 16.69 | 1.20 | 1.14 | 42.4 |
| 250–32–4 | 77 | 30 | 15.79 | 7.67 | 18.84 | 32.32 | 16.51 | 1.68 | 1.09 | 46.1 |
| 250–32–5 | 79 | 30 | 15.67 | 7.46 | 20.49 | 32.87 | 16.45 | 2.05 | 1.01 | 50.7 |
| 250–32–6 | 80 | 30 | 15.41 | 7.42 | 22.01 | 31.89 | 16.51 | 1.91 | 0.95 | 54.3 |
| 250–34–1 | 73 | 26 | 15.90 | 7.64 | 16.91 | 31.29 | 16.53 | 1.32 | 1.19 | 39.8 |
| 250–34–2 | 75 | 26 | 15.49 | 7.28 | 18.19 | 32.54 | 16.65 | 1.89 | 1.10 | 45.2 |
| 250–34–3 | 76 | 26 | 15.40 | 7.35 | 19.31 | 32.36 | 16.62 | 1.72 | 1.05 | 48.4 |
| 250–34–4 | 77 | 26 | 15.24 | 7.27 | 20.00 | 32.56 | 16.60 | 1.39 | 1.01 | 50.7 |
| 250–34–5 | 79 | 26 | 15.14 | 7.18 | 21.03 | 32.29 | 16.56 | 2.24 | 0.97 | 53.5 |
| 250–34–6 | 80 | 26 | 15.08 | 7.17 | 21.40 | 32.49 | 16.61 | 1.79 | 0.95 | 54.8 |

*Assume ammoniation of filtrate $P_2O_5$ ($H_3PO_4$) to 13–52–0 level.
**Digestion mother liquor.

As shown in Table I, the sample coded 250–32–6 was concentrated from the mother liquor having the analysis indicated above to 80% solids. The concentrated mixture was cooled to 30° C. The data show that 54.8% of the total nitrogen in 246–37–1f was crystallized as ammonium nitrate. The crystals were removed from the cooled slurry by centrifugation, with a mother liquor (filtrate) analyzing 15.41% N and 22.01% $P_2O_5$. This liquor can then be ammoniated to a level suitable for fertilizer use, granulated or prilled, and dried if necessary. Other plant nutrients can be added if desired. For purposes of illustration, 250–32–6 filtrate was assumed to be ammoniated to a level where the added ammonia and $P_2O_5$ would, if considered separately, correspond to a 13–52–0 product. This calculation shows a final fertilizer product with a calculated N:$P_2O_5$ ratio of 0.95 would result.

All other samples can be considered in the same manner as 250–32–6. It is obvious from these results that the fertilizer product N:$P_2O_5$ ratios can be lowered from 1.80 to 0.95 and even lower if changes in concentration and temperature are made to crystallize more ammonium nitrate than in the given examples.

The basic principle of this process is also not limited by the analysis of the digestion mother liquor; that is, the mother liquor can have $N:P_2O_5$ ratios greater or less than that used in Example I.

The N-P and/or N-P-K fertilizer products can be granulated or prilled by known methods.

While in the foregoing specification I have set out a specific procedure in considerable detail for the purpose of illustrating embodiments of the invention, it will be understood that such details may be varied widely by those skilled in the art without departing from the spirit of the invention.

I claim:
1. In a process for the preparation of low $N:P_2O_5$ ratio mixed fertilizers and ammonium nitrate and in which phosphate rock is digested in an attack solution of nitric acid and ammonium sulfate to produce gypsum and a phosphoric acid-ammonium nitrate liquor after gypsum is removed, the steps of concentrating and cooling said liquor to crystallize ammonium nitrate while maintaining the pH of said liquor below 1.5, removing said crystallized ammonium nitrate, and ammoniating said liquor which contains phosphoric acid and uncrystallized ammonium nitrate.

2. The process of claim 1 in which said gypsum is treated with ammonia and carbon dioxide to produce ammonium sulfate and the ammonium sulfate recycled to said digestion step.

3. The process of claim 1 in which said liquor prior to being cooled for crystallizing said ammonium nitrate is concentrated to about 70–85 percent solids.

4. The process of claim 1 in which said concentration liquor is cooled to about 15–450 C.

5. The process of claim 1 in which crystalline ammonium nitrate is separated from the cooled, concentrated liquor.

6. In a process for the preparation of low $N:P_2O_5$ ratio mixed fertilizers and ammonium nitrate in which process phosphate rock is digested by a solution of nitric acid and ammonium sulfate to produce gypsum and mother liquor containing phosphoric acid and ammonium nitrate, the gypsum being separated, treated with ammonia and carbon dioxide to produce ammonium sulfate and the ammonium sulfate recycled to said digestion step, the steps of concentrating said mother liquor to about 73–80 percent solids, cooling the concentrated liquor to about 15–45° C. to produce ammonium nitrate crystals while maintaining the pH of said liquor below 1.5, separating said crystals, and ammoniating said liquor containing phosphoric acid and uncrystallized ammonium nitrate to an $N:P_2O_5$ ratio substantially less than 2.0.

7. The process of claim 6 in which the pH of the system is maintained below 0.5 prior to said ammoniation of the liquor.

8. The process of claim 6 in which said concentrated liquor is cooled to about 25–35° C.

9. The process of claim 6 in which said mother liquor after removal of ammonium nitrate is ammoniated to an $N:P_2O_5$ ratio of about 1.0.

References Cited
UNITED STATES PATENTS 2,689,175  9/1954  Strelzoff _____ 71—39

JAMES L. DECESARE, Primary Examiner